US006524400B1

(12) United States Patent
Pircher et al.

(10) Patent No.: US 6,524,400 B1
(45) Date of Patent: Feb. 25, 2003

(54) PROCESS FOR THE PRODUCTION OF GRAIN-ORIENTED ELECTRIC QUALITY SHEET WITH LOW REMAGNETIZATION LOSS AND HIGH POLARIZATION

(75) Inventors: Hans Pircher, Mülheim/Ruhr (DE); Rudolf Kawalla, Bottrop (DE); Manfred Espenhahn, Essen (DE); Andreas Böttcher, Dulsburg (DE); Klaus Günther, Voerde (DE); Hans Huneus, Herne (DE); Carl-Dieter Wuppermann, Krefeld (DE)

(73) Assignee: Thyssen Krupp Stahl AG, Dusseldorf (DE)

( * ) Notice: Subject to any disclaimer, the term of this patent is extended or adjusted under 35 U.S.C. 154(b) by 0 days.

(21) Appl. No.: 09/529,339

(22) PCT Filed: Sep. 9, 1998

(86) PCT No.: PCT/EP98/05732

§ 371 (c)(1),
(2), (4) Date: Jun. 6, 2000

(87) PCT Pub. No.: WO99/19521

PCT Pub. Date: Apr. 22, 1999

(30) Foreign Application Priority Data

Oct. 15, 1997 (DE) .......................... 197 45 445

(51) Int. Cl.$^7$ ................................ H01F 1/04
(52) U.S. Cl. ...................... 148/111; 148/113
(58) Field of Search ................ 148/110–113

(56) References Cited

U.S. PATENT DOCUMENTS 4,054,470 A * 10/1977 Malagari .................... 148/111
4,986,341 A * 1/1991 Masuda et al. ............. 164/477
5,203,928 A * 4/1993 Inokuti et al. .............. 148/111
5,711,825 A   1/1998 Espenhahn et al.
6,159,309 A * 12/2000 Kurosaki et al. ........... 148/308

FOREIGN PATENT DOCUMENTS

| DE | 196 28 136 C1 | 4/1997 |
| DE | 196 28 137 C1 | 4/1997 |
| EP | 0 219 611 A1 | 4/1987 |
| EP | 0 619 376 A1 | 10/1994 |
| JP | 59-031823 A | 2/1984 |
| JP | 5-105956 | * 4/1993 |

* cited by examiner

Primary Examiner—John Sheehan
(74) Attorney, Agent, or Firm—Proskauer Rose LLP

(57) ABSTRACT

A process for the production of grain-oriented electric quality sheet by melting a silicon steel and casting the melt continuously into a strand having a thickness of 25–100 mm. During solidification the strand is cooled to a temperature above 700° C. and divided into thin slabs. The thin slabs then pass through an equalization furnace standing in line where they are reheated to a temperature ≦1170° C. and continuously rolled in a multi-stand hot rolling mill to give hot strip having a thickness of ≦3.0 mm. The first shaping pass is performed at a temperature in the rolling stock up to 1150° C. The reduction in thickness is at least 20%. The hot strip is cold rolled in one or more stages with recrystallizing intermediate annealing to a final thickness in the range of 0.15–0.50 mm. The cold strip is then annealed with recrystallization and decarburization, furnished with a predominantly MgO-containing annealing separator and given a final annealing for imprinting a Goss texture. The strip is then coated with an electric insulation and given a stress-free annealing.

9 Claims, No Drawings

PROCESS FOR THE PRODUCTION OF GRAIN-ORIENTED ELECTRIC QUALITY SHEET WITH LOW REMAGNETIZATION LOSS AND HIGH POLARIZATION

BACKGROUND OF THE INVENTION

The invention relates to a process for the production of grain-oriented electric quality sheet with low remagnetization loss and high polarization.

For the production of grain-oriented electric quality sheet, steels are smelted and cast which contain 2.5 to 4.0% Si, 0.010 to 0.100% C, up to 0.150% Mn, up to 0.065% Al and up to 0.0150% N, and optionally 0.010 to 0.3% Cu, up to 0.060% S, up to 0.100% P, up to 0.2% As, Sn Sb, Te and Bi respectively, residue iron and unavoidable impurities. Without being cooled below 700° C. the solidified strands with thicknesses of 25 to 100 mm are cut up into thin slabs and homogeneously thoroughly heated in an equalization furnace standing in line to a temperature up to 1170° C., the dwell time being 60 minutes at the most. These homogeneously thoroughly heated thin slabs are then rolled out continuously in a multi-stand hot rolling mill into hot strip having a thickness of 0.5 to 3.0 mm and coiled. Finally the hot strip is optionally annealed. The hot strip thus treated is cold rolled in one or more passes to a finished strip thickness of 0.15 to 0.50 mm. The cold strip is annealed with recrystallization and decarburization. Then after the application of a predominantly MgO-containing annealing separator, the strip is subjected to high temperature annealing with secondary recrystallization, so that a very sharp Goss texture is set up. In a final annealing the strip is then insulated and relieved of inner residual stresses.

Grain-oriented electric quality sheets are used more particularly in output transformers for guiding the magnetic flux. This requires as low remagnetization losses as possible and as high polarization values as possible. For this purpose, in grain-oriented electric quality sheets, a very sharply marked Goss texture is produced in a controlled manner, so that very satisfactory magnetic properties are obtained along the rolling direction as the preferred magnetic direction.

For more than 20 years, the production of flat steel products was begun by the continuous casting of melts by use of strand-casting technique. The melt is cast into a chill mold, from which it emerges as a solidifying strand approximately 100 to 300 mm in thickness. The strand is then normally guided in an arch from the perpendicular to the horizontal and cooled. After leaving the continuous casting installation the strand is divided up into individual slabs. Simple mild steel slabs are normally kept in a slab store, where they cool to ambient temperature. In contrast, slabs for grain-oriented electric quality sheet, which are alloyed with 2.5 to 4.0% Si, must be stored at higher temperatures since they are more liable to form cracks during re-heating prior to hot strip rolling, if they have previously been cooled to excessively low temperatures. In this instance the large slab thickness of the conventional continuous casting process proves to be particularly disadvantageous since it causes high and inhomogeneous temperature gradients during the reheating of the slabs, and these lead to high internal stresses. Slabs for grain-oriented sheet must therefore normally be stored in heated holding furnaces at temperatures of, for example, 100 to 500° C. The disadvantages of this method are the increased energy expenditure and the increased complication and cost of processing.

Slabs produced by the conventional continuous casting process are then introduced into a pusher furnace, a walking beam furnace or a unit of equivalent effect and heated to high enough temperatures, so that satisfactory shapeability is achieved. Hot rolling is then normally performed in two component steps: the slabs 100 to 300 mm thick are first rough rolled to a thickness of approximately 30 to 60 mm. The rough rolling is frequently performed in reversing stands. The roughed slabs are then continuously rolled out in a multi-stand finishing step to give hot strip in thicknesses of 2.0 to 6.0 mm.

Grain-oriented sheet produced by the conventional processes has the special feature that the slabs must absolutely be heated to temperatures up to 1400° C. to dissolve foreign phase particles in the slab, so that they can be separated finally dispersed during the subsequent hot rolling (U.S. Pat. No. 2,599,340). In one prior art process, for example, these particles are mainly Mn sulfides or Mn selenides (J. E. May and D. Turnbull: Trans. AIME, 212 (1958), 769). In another process additional Al nitrides are produced (U.S. Pat. Nos. 3,159,511; 3,287,183). In a further process MnSe and MnSb are produced (DE 23 51 141 A). Other nitrides are also known, such as VN, (Al, Si)N, . . . (DE 19 20 666 A, EP 0 219 611) and sulfides such as $Cu_2S$, TiS, CrS, . . . (EP 0 619 376 A1, DE 23 48 249 A). In general the purpose of these particles is to block the movement of grain boundaries in the following production steps up to before the secondary recrystallization, thereby inhibiting normal grain growth during different annealing treatments. For this reason they are known as grain growth inhibitors. Only those particles from a distribution of particles of different size which are smaller than approximately 100 nm can adequately hinder the movement of the grain boundaries and function as inhibitors. Lastly, during the high temperature annealing the inhibitors control the process of secondary recrystallization which leads to the formation of the desired very sharp Goss texture.

In conventional continuous casting the precipitations following casting and solidification are usually so coarse that practically no particles exist below a size of 100 nm. For this reason the coarse particles must be dissolved during slab preheating. In the case of the Mn sulfides, for this purpose annealing temperatures up to approximately 1400° C. are required. The particles are again precipitated in the desired manner during subsequent hot rolling with suitably adjusted parameters (pass plans and shaping temperatures in the different stands, cooling).

The heating of the slabs to the high temperature required for dissolving the particles acting as grain growth inhibitors can be performed either directly in one furnace or in two furnaces successively. In the latter case the slabs are heated in the first furnace, for example, to 1250° C., then in the second furnace to temperatures up to 1400° C. Although it makes the process more complicated and expensive, it has proved advantageous for the magnetic properties of the finished product to perform between these two stages a first hot shaping of the slab (prerolling) in order to homogenize and refine its structure (EP 0 193 373 B1).

The high slab preheating temperature required for the formation of the inhibitor phase makes the manufacturing process for hot strip for grain-oriented sheet difficult and expensive, because investments are required for special costly high temperature furnaces, since the liquid scale occurring on silicone steel slabs above 1350° C. damages the furnace hearth, this being connected with damage to the underside of the slabs which causes production losses. The optionally interposed prerolling also makes production expensive and eliminates capacity which might be utilized for the production of other flat steel products.

MnS or MnSe particles have only a limited effect on grain growth inhibition. It must be offset by only a correspondingly adapted driving force for grain size enlargement to enable the desired Goss selection process to take place at the right moment during secondary recrystallization. This means that the degree of shaping during the final cold rolling stage to final thickness must not be excessive. The most advantageous reduction of thickness in this cold rolling stage of the Si steel inhibited with MnS or MnSe is 40 to 60%. Since the hot strip thickness can, only with difficulty, be reduced below 2.0 mm by the conventional hot rolling technology without losses of quality and production, the optimum degree of shaping during cold rolling to final thickness must be obtained by rolling in a number of stages, between which a recrystallizing intermediate annealing is interposed. The grain-oriented sheet produceable in this expensive way has faulty orientation angles up to approximately 10% in relation to the exact Goss position.

A further development of the aforementioned process, which leads to even smaller faulty orientations and therefore to improved magnetic properties, is the so-called Hi-B process (U.S. Pat. Nos. 3,159,511, 3,287,183) wherein, in addition to MnS, AlN particles are used as a further inhibitor phase. Just like the first-mentioned process it has the disadvantage that high slab heating temperatures of, for example, 1400° C. are required for dissolving the MnS particles. After hot strip rolling the AlN is not yet present in a suitable finely dispersed particle distribution, but reaches this only by a precipitation annealing of the hot strip, followed by quenching. The inner texture of the hot strip in regards to its chemical composition, the formation of its grain structure and the morphology of its second phase components must therefore be of such a nature that the hot strip has the capacity to precipitate AlN inhibitor phase particles. The AlN particles reinforce grain growth inhibition as a whole.

This advantageously makes possible a merely single-stage cold rolling operation with a fairly high degree of shaping. The increased energy thereby stored in the matrix is now in equilibrium with a stronger inhibition, so that selection is improved in secondary recrystallization. The result is a sharper Goss texture (faulty orientation angle to the exact Goss position only 3 to 5%) and therefore improved magnetic properties.

To overcome the disadvantages of the aforedescribed conventional processes caused by the high slab preheating temperature, in recent years a number of new production processes were developed for grain-oriented electric quality sheet, in which the necessary slab temperature was reduced to values below 1330° C. Of these "low heating" processes, the following two may be quoted which were introduced into industrial practice and form part of the latest prior art.

The process disclosed in EP 0 219 611 operates entirely without sulfidic inhibitors. The S content can therefore be reduced to the level of traces. The slab preheating temperature is very specially low, having values below 1200° C. It is therefore impossible to form an effective enough inhibitor phase which is already present ready in the hot strip. Neither does such a hot strip produced by the conventional continuous casting technology have the capacity to form a corresponding inhibitor phase via a precipitation annealing. The inhibitor AlN is therefore formed by nitration of the strip cold rolled to finished strip thickness prior to high temperature annealing. EP 0 321 695 B1 sets forth various methods by which such a nitration operation can be performed.

Another process (EP 0 619 376 A1) uses copper sulfides as the inhibitor. They have a distinctly lower solubility temperature and faster solubility kinetics than AlN and MnS. It is true that inhibitor formation does not yet take place in the correct manner during hot rolling, but the hot strip produced by this process has the capacity for the precipitation of copper sulfide inhibitor particles. They are produced during a precipitation annealing treatment of the hot rolled strip.

The conventional production of hot strip from continuously cast slabs described hereinbefore is very expensive technologically and also costly in time and money. Many steel manufacturers are therefore today developing casting processes close to final dimensions. These aim at hot strip thicknesses below 6 mm or even at finished strip thicknesses down to 0.01 mm (EP 0 417 318 B1). Commercial processes have been put into effect for certain kinds of special quality steel and for amorphous materials. The large scale industrial production of grain-oriented sheet with 2.5 to 4% Si via strip casting processes has hitherto been unsuccessful. One of the main problems is to achieve in a controlled manner during solidification in the small thicknesses and during the subsequent cooling, structural and precipitation structures which, after further cold shaping and heat treatments, produce a sharp Goss texture in the finished product, so that due to its magnetic properties, such product is competitive with the grain-oriented electric quality sheet produced by the conventional continuous casting technology (EP 0 390 160 B1, EP 0 540 405 B1).

The production of hot strip via the casting of thin slabs and their direct hot rolling is already known from the prior art (e.g., EP 0 286 862 B1). The problem has not yet been solved of using this technology in the production of grain-oriented electric quality sheet. The special difficulty exists, not only of making a product of mechanical and technological satisfactory properties, but also of forming the grain growth inhibiting phase in the correct manner, so that the finished product can have satisfactory magnetic properties.

Japanese laid-open specification No. 56-158816 discloses a process for producing grain-oriented sheet with 2.5 to 4% Si via the continuous casting of thin slabs with thicknesses of 3 to 80 mm and subsequent hot rolling to 1.5 to 3.5 mm using MnS and MnSe as the main inhibitors. In this case the larger hot strip thickness has the disadvantage that the standard final thicknesses below 0.35 mm commercially available for grain-oriented electric quality sheet can be produced only by degrees of cold rolling above 76% in the case of single-stage cold rolling, or by convention multi-stage cold rolling with intermediate annealing. One disadvantageous aspect of this method of operation is that the high degree of cold shaping is not adapted to the relatively weak inhibition by MnS and MnSe. This leads to unstable and unsatisfactory magnetic properties in the finished product. Alternatively, a more expensive and more elaborate multi-stage cold rolling process with intermediate annealing must be accepted. Nor is the casting speed uncoupled from the speed of passage through the equalizing furnace. The result is the disadvantage of a lower flexibility in the use of the equalization furnace for a controlled precipitation of sulfidic inhibitors.

It is an object of the invention to obviate disadvantages of the conventional production methods and also to utilize the economical advantages of thin slab casting for grain-oriented electric quality sheet.

SUMMARY OF THE INVENTION

The solution to the problem in question is obtained by a process of optimizing the production steps casting, solidification and hot rolling. Connected herewith is the selection of various mechanisms for the formation of the inhibitor phase and the adaptation of the subsequent processing steps.

In the process according to the invention, similar to that in the prior art, a melt is continuously cast in a vertical chill mold, whereafter the melt solidifies and the resulting strand is guided over the arc of a circle into the horizontal and cooled at the same time. The strand has a thickness of only 25 to 100 mm, preferably 40 to 70 mm. It is not completely cooled, instead its temperature does not drop below 700° C. The hot strand is divided into thin slabs which are guided directly through an equalizing furnace standing in line, in which they remain for 60 minutes at the most, preferably for up to 30 minutes. In their passage through the equalizing furnace the thin slabs are thoroughly heated homogeneously, reaching a relatively low temperature of 1170° C. at most. Then the thin slabs are directly guided through a multi-stand hot rolling step standing in line, where they are continuously hot rolled to the hot strip thickness of 0.5 to 3.0 mm. Ideally the hot strip thickness is selected so that the following cold rolling operation is performed in only one stage. The degree of shaping to which the cold rolling must be carried out depends on the particular inhibitor effect, which can be adjusted in various ways.

The advantage of the method of operation according to the invention is on the one hand the utilization of a large proportion of the heat from the casting process, thus eliminating the need to keep the slabs hot in heated furnaces, as known for grain-oriented sheet in the prior art, and the need to reheat the slabs to high temperatures in pusher furnaces or walking beam furnaces. The purpose of the substituted annealing treatment in an equalizing furnace is to adjust a clearly-defined homogeneous temperature over the entire thickness of the thin slab. Due to their thinness, the slabs require substantially less time for this purpose than is the case with conventional slabs having a thickness of 100 to 300 mm. In this way considerable quantities of energy and reheating time is saved in comparison with the prior art.

The thinness of the slabs also eliminates the prerolling inserted in the slab heating process for structural homogenization and also the rough rolling at the start of the hot strip rolling process. This achieves a considerable shortening of the production method, direct savings in costs and increased capacities in the hot strip mill for the production of other flat steel products.

The aforementioned shortening of the production process is partially also continued in the subsequent processing stages, since with the method of operation according to the invention additionally smaller hot strip thicknesses than conventional can be adjusted down to 0.5 mm, so that the multi-stage cold rolling hitherto sometimes practiced is no longer absolutely necessary, and cold rolling can now be done in only one stage.

According to the invention, to be able to utilize the aforedescribed advantages deriving from the casting/rolling process for the production of grain-oriented electric quality sheet, the hot rolling parameters must be so selected that the material remains sufficiently ductile. Tests have shown that in preliminary material for grain-oriented electric quality sheet, ductility is at the maximum if the strand is cooled after solidification to approximately 800° C. and then spends only a short time at equalization temperature, for example, 1150° C., and is at the same time homogeneously thoroughly heated. Such material has optimum hot rollability if the first shaping pass is performed at temperatures below 1150° C. with a degree of deformation of at least 20%, whereafter the rolling stock is brought from an intermediate thickness of 40 to 8 mm to rolling temperatures below 1000° C. by means of high pressure intermediate stand cooling devices within at least two successive shaping passes. This prevents the rolling stock from being deformed in the temperature zone around 1000° C. which is critical for ductility.

DETAILED DESCRIPTION OF THE INVENTION

Table 1 shows the chemical composition of four steels, whose suitability was investigated for hot rolling in the manner according to the invention.

TABLE 1

| | Chemical composition in % by weight | | | | | | | |
|---|---|---|---|---|---|---|---|---|
| Steel | C | Si | Mn | S | Al | N | Cu | Sn |
| A | 0.076 | 3.25 | 0.077 | 0.025 | 0.025 | 0.008 | 0.07 | 0.12 |
| B | 0.060 | 3.15 | 0.077 | 0.025 | 0.027 | 0.008 | 0.07 | 0.08 |
| C | 0.040 | 3.15 | 0.085 | 0.027 | 0.022 | 0.008 | 0.08 | 0.07 |
| D | 0.030 | 3.15 | 0.063 | 0.020 | <0.003 | <0.005 | — | — |

The tests were carried out on 20 mm round tensile samples, which were briefly melted in the central range and then so cooled as corresponds to a 60 mm thin slab at casting speeds ($v_g$) of 2.8 m/min and 4.5 m/min respectively. Cooling was terminated at 800° C. After a continuous furnace cycle, the samples were then heated to temperatures ($T_W$) and maintained thereat for different times ($t_W$). Then the samples were subjected to the tensile test at the temperature ($T_W$).

The results of the test are shown in Table 2.

TABLE 2

| Hot tensile tests to determine the ductility of steels in the cast state | | | | | | |
|---|---|---|---|---|---|---|
| $v_g$ (m/min) | $T_w$ (° C.) | $t_w$ (min) | Steel A Z (%) | Steel B Z (%) | Steel C Z (%) | Steel D Z (%) |
| 2.8 | 1130 | 0 | 49 | 73 | 72 | >95 |
| 2.8 | 1130 | 50 | 33 | 45 | 60 | >95 |
| 2.8 | 1050 | 12 | 45 | 52 | 67 | >95 |
| 2.8 | 1000 | 17 | 24 | 47 | 59 | >95 |
| 4.5 | 1130 | 0 | 40 | 58 | 71 | >95 |
| 4.5 | 1130 | 50 | 32 | 48 | 56 | >95 |
| 4.5 | 1050 | 12 | 40 | 50 | 47 | >95 |
| 4.5 | 1000 | 17 | 23 | 50 | 45 | >95 |

$v_g$ = casting speed;
$T_w$ = heating temperature
$t_w$ = holding time at $T_w$:
Z = breaking constriction The breaking constriction is the essential characteristic of ductility. As the data show, the steels react with different sensitivity to the particular stressing cycles, in dependence on their chemical composition. Steel D shows the lowest and steel A the highest losses of breakage constriction/ductility.

The effectiveness of the steps according to the invention is most impressively demonstrated by steel A. At both casting speeds the heating temperatures of 1130° C. and 1050° C. produce comparatively satisfactory breaking constrictions, while a heating temperature of 1000° C. leads to reduced ductility. The latter also applies to a lengthening of the holding time at heating temperature.

The heating temperature zone around 1000° C. was investigated for steel B in the aforedescribed manner. The result is shown in Table 3.

TABLE 3

Breaking constriction (Z) of steel B as a function of heating temperature ($T_w$).

| $T_w$ (° C.) | 1100 | 1050 | 1000 | 950 | 900 | 850 |
|---|---|---|---|---|---|---|
| Z (%) | 65 | 50 | 45 | 55 | 60 | 65 |

($v_w$ = 2.8 m/min; $t_w$ = 20 min)

The breaking contraction values in Table 3 show that the ductility of the steel decreases at temperatures in the range of 1100° C. to 1000° C. and rises again at temperatures below 1000° C.

For an advantageous application of the aforedescribed casting/rolling process for the production of grain-oriented electric quality sheet, the inhibitor phase must also be formed in a suitable manner. In this respect three basic possibilities are set forth below.

The first possibility is based on the fact that, compared with conventional continuous casting, solidification following casting can be performed very quickly. With a strand only, for example, 65 mm in thickness the heat can be substantially more quickly removed than in the case of a strand, for example, 250 mm in thickness. While for this reason in a conventional thick slab only very coarse sulfides, more particularly MnS particles are present, which cannot function as inhibitors, the rapid cooling of a much thinner strand with a correctly chosen casting speed offers the possibility of having inhibitors available directly after hot rolling.

The complete precipitation of the sulfidic particles can take place during the homogeneous thorough heating in the equalizing furnace; as quick a passage through this furnace as possible must be the aim, so that the particles do not grow excessively large, thereby weakening the inhibitor effect. A hot strip produced in this manner therefore already contains the complete inhibitor phase.

To enable the sulfidic inhibitor phase particles to be precipitated as finely dispersed as possible, the Mn content must be in the range of 0.050 to 0.100% and the S content in the range of 0.015 to 0.035%. Excessively small proportions of these elements prevent an adequate quantity of substance for the inhibitors. Excessively high proportions cause the precipitation of excessively coarse particles. The proportions of Mn and S should therefore be in the limits of 0.05 to 0.10% mn and 0.015 to 0.35% S.

With this method of operation it is unnecessary to perform multi-stage cold rolling with intermediate annealing, but the hot strip thickness can be adjusted so low that further processing can take place with only one cold rolling stage. The degree of cold rolling should be in the of 45 to 75%.

It is true that it is a considerable advantage of the process not to have to cold roll in several stages, but in some circumstances it may have logistic advantages to produce only hot strip of a selected fixed thickness and to adapt the degrees of cold shaping by multi-stage cold rolling, in dependence on the application.

This first process therefore allows multi-stage cold rolling with intermediate annealing.

A second possibility for forming a suitable inhibitor phase is an annealing step advantageously to be performed at 800 to 1100° C. Alternatively the coiling temperature can be adjusted to lower than or equal to 900° C. This annealing improves the grain structure in the hot strip, more particularly increasing the size of the structural areas close to the surface, which are important for the further processing steps. Additional inhibitors are not formed with the aforementioned heat treatments.

A third possibility is a process wherein the hot strip does not yet contain the grain growth inhibitors in their final form, but is of such a nature that it has the capacity of forming corresponding inhibitor particles during an equalizing annealing. Copper sulfide and aluminum nitride are particularly suitable inhibitors for this purpose. This procedure has the advantage that hot strip production (casting, solidification, equalization annealing, hot rolling) must not also be optimized for an optimum formation of the inhibitor phase, and this opens up additional degrees of freedom. However, the cooling rate of the cast strand must be high enough for the grain structure of the thin slab not to become too coarse. For this purpose it also makes sense to select as short a dwell time as possible in the equalizing furnace. The precipitation of the inhibitor particles takes place during a precipitation annealing of the hot strip at 950 to 1150° C., which is terminated with a particularly rapid cooling. In the annealing treatment the inhibitor-phase-forming elements are put into solution, and then the inhibitor phase is precipitated finely dispersed with the very rapid cooling, preferably with sprayed water, at $\geq 20$ K/sec. This manner of operation is possible since copper sulfides have a distinctly lower solubility temperature and more rapid reaction kinetics than, for example, MnS. The same thing applies to AlN in austenite. The use of carbon contents greater than 0.05% is therefore also to be recommended. The carbon content must be so high than an austenite transformation can take place at least to a small extent. If it is selected above 0.10%, however, problems may arise with decarburizability.

The degree of cold shaping can be taken as 70 to 90%—distinctly higher than in the first process described above. The higher energy introduced thereby and therefore the higher driving force to secondary grain growth offsets a correspondingly higher inhibitor effect with the third process described above. Similarly to in the HiB process, the result is a better selection of texture and therefore a sharper Goss position in the finished strip and lastly improved magnetic properties, compared with the material produced in accordance with the first process described above.

A process is characterized herein in which the inhibitor used is exclusively AlN. Its advantage lies in the practically complete avoidance of copper and sulfur in the melt, something which facilitates hot rollability and reduces the brittleness of the material. Similar to in the first process described above, the inhibitor forming elements (Al and N) present in the melt are partly prevented from precipitation by the high cooling rate of the cast strand. Any particles nevertheless precipitated are only small. The complete precipitation takes place as in claim 3 during the homogeneous thorough heating in the equalizing furnace.

The hot strip can also have the capacity for the precipitation of further AlN particles which can act as inhibitors, if a sufficiently high carbon content ensures that enough austenite is produced in a precipitation annealing of the hot strip. The total inhibitor effect adjusted in such a material therefore depends on how quickly the cooling of the strand takes place—i.e., how many effective inhibitors were able to form spontaneously at the start. It furthermore depends on how many inhibitors were also produced during the precipitation of the hot strip; this depends very essentially on the carbon content. Different degrees of cold shaping must be adjusted, in dependence on the strength of this total inhibition effect.

Various supplementary process features are described herein which facilitate an application of the process outlined above.

The addition of up to 0.10% phosphorus heavily favors a finely structured formation of the solidification structure, without the occurrence of negative effects, such as an embrittlement of the material.

The step to limit the overheating temperature during casting to a maximum 25 K above the liquidus temperature, has basically the same aim as the steps to make the solidification structure as homogeneous and fine-grained as possible. If the melt is cast with a temperature which is only very slightly above the liquidus temperature of the corresponding alloy, the result is a substantially globulitic solidification structure, and dentritic growth is limited. Generally in the production of grain-oriented electric quality sheet it is always important to adjust as fine a solidification structure as possible, so that both the textural, but also the structural development can take place as homogeneously as possible in the volume of the slab/thin slab. As fine a structure as possible also particularly favors the desired finely dispersed precipitation of the inhibitor phase.

A possible way is described of reinforcing the total inhibition effect, namely to form, by a nitration treatment of the strip cold rolled to finished strip thickness, in the matrix additional AlN particles, the size of a sufficiently large proportion of which is below 100 nm. In any case, the resulting additional AlN particles must be formed in the matrix prior to the start of secondary recrystallization, so that they can further advantageously influence secondary recrystallization. The nitration treatment can be performed in the heating phase at the start of the high temperature annealing and be produced, for example, by a heavily nitrogen-containing annealing atmosphere. However, it can also be produced by additives to the predominantly MgO-containing annealing separator, such additives consisting of substances which at the start of high temperature annealing give off nitrogen, which can then diffuse into the matrix. In this connection a very effective method of nitration is to interpolate a corresponding stage of the process at the end of the decarburization annealing, so that nitrogen can diffuse out of the annealing gas into the strip.

Elements segregating at the grain boundaries, such as As, Sn, Sb, Te and Bi in a quantity of up to 0.2% each (claim 10) exert a favorable influence on the stabilization of the secondary recrystallization and the sharpening of the Goss texture.

What is claimed is:

1. A process for producing a grain-oriented electric quality sheet, comprising the steps of:

a. preparing a melt of a steel comprising, in % by weight:

| | |
   |---|---|
   | 2.5–4.0 | Si, |
   | 0.01–0.10 | C, |
   | up to 0.30 | Cu, |
   | up to 0.15 | Mn, |
   | up to 0.060 | S, |
   | up to 0.065 | Al, |
   | up to 0.015 | N |
   | up to 0.10 | P, | and optionally up to 0.2% by weight of at least one of As, Sn, Sb, Te and Bi, remainder Fe and unavoidable impurities;

b. continuously casting the melt into a strand having a thickness of 25 to 100 mm which is cooled during solidification to a temperature greater than 700° C.;

c. subsequently dividing the strand into thin slabs;

d. passing the thin slabs through an equalization furnace in which the thin slabs are reheated to a temperature ≦1170° C., the dwell time in the equalization furnace being up to 60 minutes;

e. continuously rolling the thin slabs in a multi-stand hot rolling mill to produce a hot strip having a thickness of 0.5–3.0 mm, a first shaping pass being performed at a temperature ≦1150° C. and with a reduction in thickness of at least 20%;

f. coiling the hot strip;

g. cold rolling the hot strip after coiling in one or more stages with recrystallization intermediate annealing to a final thickness in a range of 0.15–0.50 mm producing a cold strip;

h. annealing the cold strip with recrystallization and decarburization and applying a predominantly MgO-containing annealing separator and annealing to imprint a Goss texture; and i. coating the annealed cold strip with an electric insulation; and j. providing the coated cold strip with a stress-relieving annealing.

2. A process according to claim 1, wherein during the step of continuously rolling the thin slabs, the thickness of the thin slabs is reduced from a thickness of 40 mm to a thickness of 8 mm at a temperature below 1000° C. by high pressure cooling devices by performing no more than two successive shaping passes.

3. A process according to claim 1, wherein the melt comprises, in % by weight:

| |
   |---|
   | 0.01–0.050 C, |
   | 0.05–0.10 Mn, |
   | 0.015–0.035 S, | and wherein a hot strip having a final thickness of 0.7 to 1.3 min is cold rolled in a final cold shaping stage with a reduction in thickness in a range of 45% to 75%.

4. A process according to claim 3, wherein the hot strip is annealed at 800 to 1100° C.

5. A process according to claim 3, wherein the hot strip is coiled at a temperature below or equal to 900° C.

6. A process according to claim 1, wherein the melt comprises, in % by weight:

| |
   |---|
   | 0.03–0.1 C, |
   | 0.05–0.10 Mn, |
   | 0.015–0.035 S, |
   | 0.05–0.03 Cu, |
   | 0.015–0.065 Al, |
   | 0.005–0.015 N, and | wherein during the hot rolling step, the hot strip is precipitation annealed at 950 to 1150° C. for 30 to 300 seconds, with a subsequent accelerated cooling at a cooling rate of more than 20 K/sec, the precipitation annealing being performed before the cold shaping step with a reduction of thickness of the hot strip of 70% to 90%.

7. A processing according to claim 1, wherein the melt comprises, in % by weight:

| | |
|---|---|
| maximum | 0.010% S, |
| maximum | 0.010% Cu, |
| at least | 0.015% Al, and |
| at least | 0.005% N, | wherein the hot strip is precipitation annealed at 1000° C. to 1150° C. for 30 to 300 seconds, with a subsequent accelerated cooling of more than 20 K/sec, whereafter a reduction in thickness of 45% to 90% is performed in a cold shaping stage.

8. A process according to claim 1, wherein the melt is cast with an overheating temperature of 25 K at most above liquidus temperature.

9. A process according to claim 7, wherein AlN particles having a maximum grain size of 100 nm are formed by nitration of the strip cold rolled to finished strip thickness.

* * * * *